Jan. 23, 1968  DE WITT H. DOANE  3,364,664
GREASE EXTRACTOR FOR VENTILATING SYSTEMS
Filed July 20, 1964  2 Sheets-Sheet 1
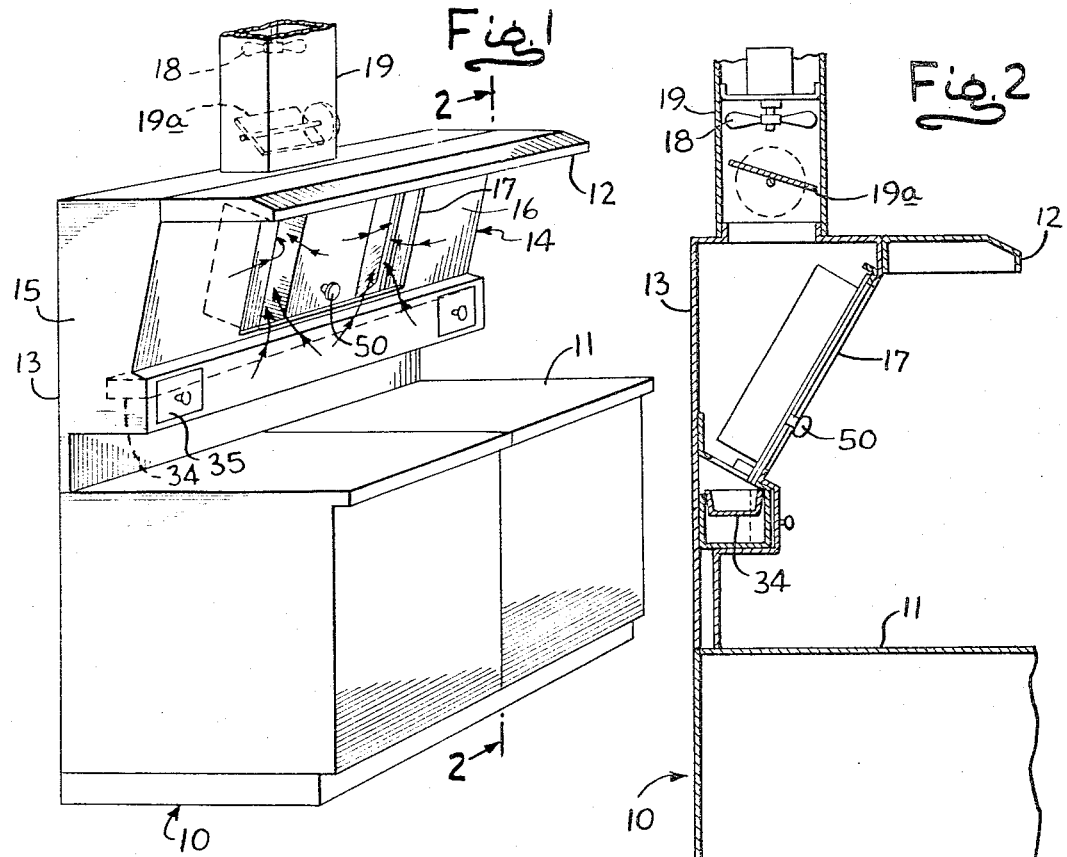
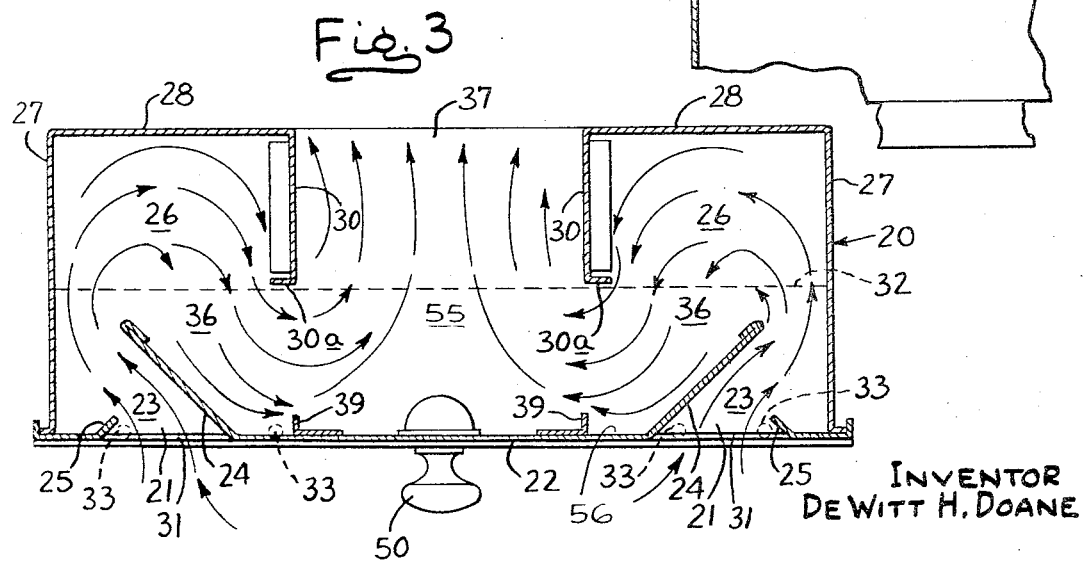
INVENTOR
DE WITT H. DOANE
by: Wolfe, Hubbard, Voit & Osann
ATTYS.

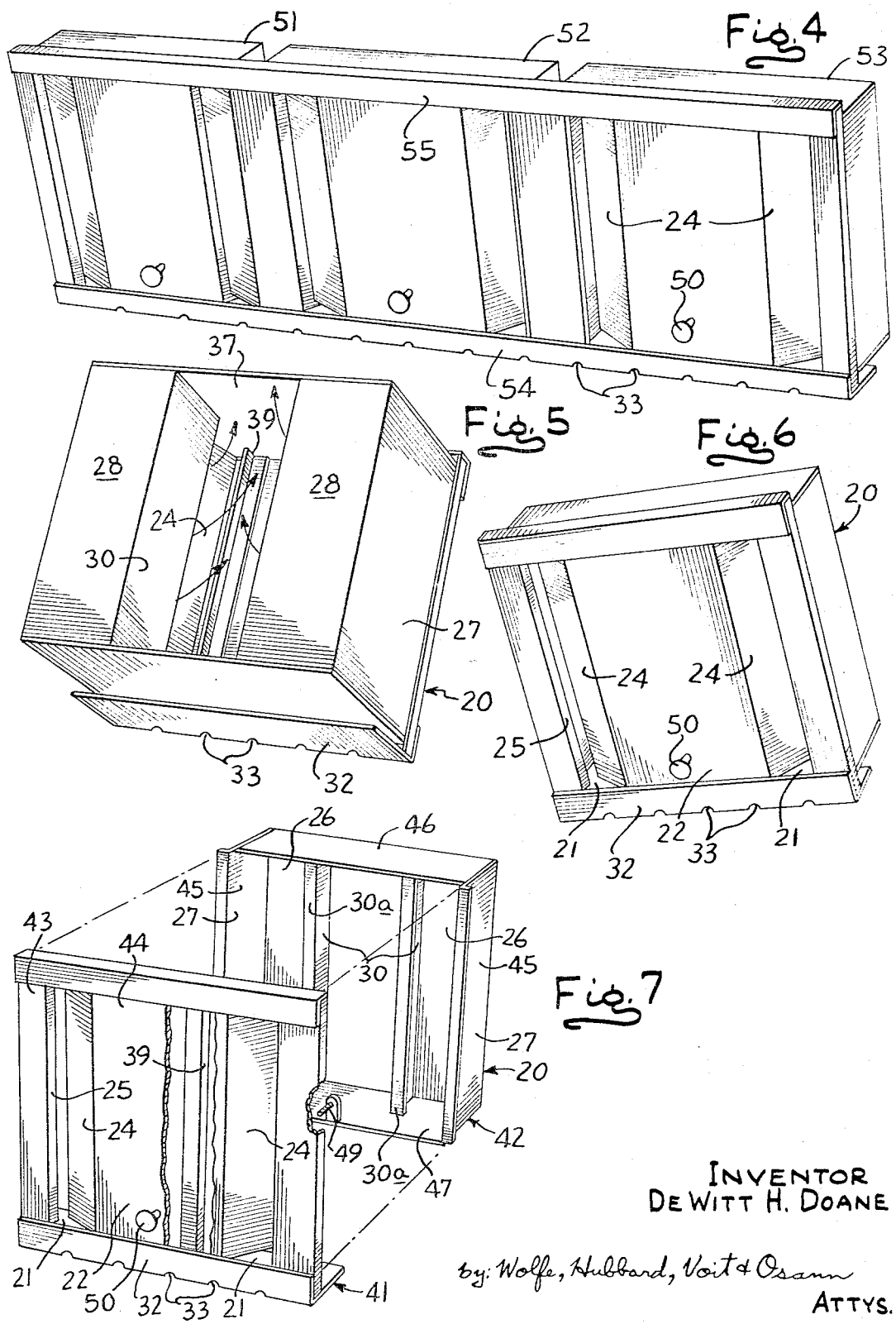

3,364,664
GREASE EXTRACTOR FOR VENTILATING
SYSTEMS
De Witt H. Doane, Mount Prospect, Ill., assignor to
Cockle Ventilator Company, Inc., Wheeling, Ill., a
corporation of Ohio
Filed July 20, 1964, Ser. No. 383,655
3 Claims. (Cl. 55—394)

The present invention relates generally to grease extractors for ventilating systems and, more particularly, to an improved grease extractor for removing grease and oil vapors from a hot vaporous exhaust stream in a ventilating system of the type commonly employed with cooking ranges and the like.

It is a primary object of the present invention to provide an improved grease extractor of the type which removes the grease and oil from a hot vaporous exhaust stream by controlling the fluid flow, i.e., without the use of filtering media, and which has a considerably higher air cleaning efficiency than previous devices of this type.

It is another object of the present invention to provide an improved grease extractor of the foregoing type which not only effectively extracts the grease and oil from vaporous exhaust streams, but also transports the extracted grease and oil rapidly and efficiently out of the path of fluid flow so that the extracted contaminants cannot become entrained in a subsequent portion of the exhaust stream.

It is a further object of the invention to provide a grease extractor of the type described which is extremely simple and economical to fabricate and maintain. A related object is to provide such a device which contains no moving parts and, if desired, can be constructed entirely of linear parts which can be brake or die formed and fastened by spot welding.

Still another object of the invention is to provide such a grease extractor which substantially reduces the fire hazard in the flue and other downstream portions of the ventilating system, and which improves the longevity of the downstream portions of the ventilating system.

A still further object of the invention is to provide such a grease extractor which is extremely simple to clean, either by immersion in a cleaning liquid or by disassembly for manual cleaning. A related object is to provide such a grease extractor which can be conveniently removed from the ventilating system as a compact unit for cleaning, repairing, replacement, or the like.

Other objects and advantages of the invention will become apparent from the following description and appended claims and upon reference to the drawings, in which:

FIGURE 1 is a perspective view of a conventional cooking range and its associated ventilating system including a grease extractor embodying the present invention;

FIG. 2 is a vertical section taken along line 2—2 in FIGURE 1 to show the internal structure of the ventilating system shown in FIGURE 1;

FIG. 3 is a sectional plan view showing the internal structure of the grease extractor of FIGURES 1 and 2 and including arrows to show the flow path of the fluid exhaust stream passing through the extractor;

FIG. 4 is a perspective showing how a plurality of the inventive grease extractors may be connected in series to increase the capacity of the ventilating system;

FIG. 5 is a perspective of the back side of the grease extractor removed from the ventilating system;

FIG. 6 is a perspective of the front side of the grease extractor removed from the ventilating system; and FIG. 7 is a front perspective showing the two sections of the grease extractor in exploded positions.

While the invention will be described in connection with a preferred embodiment, it is to be understood that the invention is not to be limited to the disclosed embodiment but, on the contrary, it is intended to cover various modifications and equivalent arrangements included within the spirit and scope of the appended claims.

Turning now to the drawings, in FIGURE 1 there is shown a cooking range 10 having a cooking surface 11 from which hot fumes laden with grease and oil vapors and other contaminants rise upwardly toward a canopy or hood 12 which projects out over at least a portion of the cooking surface 11. The range 10, which may be of any desired design and construction, is alined with an upwardly extending panel or plate 13 which forms the back of a cabinet 14 supporting the hood 12. In addition to the back panel 13, the cabinet 14 includes a pair of side walls 15 and an inclined front panel 16 which is provided with a suitable holding frame adapted to receive a grease extractor 17.

As the hot, grease-laden fumes collect beneath the hood 12, they are drawn rearwardly and upwardly through the grease extractor 17 by means of a fan or blower 18 which is mounted within a flue or vent duct 19. From the extractor, the vaporous exhaust stream is drawn upwardly through the flue 19 and eventually vented to the atmosphere. It will be understood that the blower 18 represents only one example of a suitable device for drawing the exhaust stream through the extractor, and that the invention is equally applicable to ventilating systems employing other air-moving devices, such as power roof ventilators for example.

For the purpose of controlling the rate of flow of the exhaust stream through the ventilating system, and for protecting against fires in the flue, an adjustable damper 19a is provided at the lower end of the flue 19, as can be seen in FIG. 2.

In accordance with the present invention, there is provided a grease extractor which comprises the combination of a housing including a front wall having an entrance for receiving the vaporous exhaust stream and a rear wall having an exit for discharging the exhaust stream after extraction of the grease therefrom, means defining a constriction within the housing adjacent the entrance for decreasing the cross-section and increasing the velocity of the stream, means defining an expansion chamber within the housing for receiving the velocious exhaust stream from the constriction and allowing the exhaust stream to expand so as to decrease the velocity and temperature of the stream, thereby condensing and agglomerating the grease and oil vapors in the stream, the expansion chamber being adapted to reverse the direction of flow of the exhaust stream issuing from the constriction whereby the agglomerated grease and oil are deposited on the walls of the chamber by centrifugal action due to the flow reversal, and means for directing the residual exhaust stream from the expansion chamber out through the exit of the housing. Thus, in the grease extractor 17 illustrated in the drawings, the hot, grease-laden fumes are drawn into a housing 20 through a pair of vertically elongated, transversely spaced entranceways 21 provided in the front wall 22 of the housing. The front wall 22 has a back face 56. The entrance ways are each spaced from side walls 27 by a portion of the front wall. On the edge of each entrance way nearest the adjacent side wall, that is the outboard edge, there is formed a short baffle member 25 directed inwardly of the extractor and away from the adjacent side wall 27. On the edge of each entranceway farthest from the adjacent side wall 27, that is the inboard edge, there is formed a relatively long planar baffle 24 extending inwardly of the extractor toward the adjacent side wall 27 and spaced from baffle 25. The arrangement of the baffles at each entrance way is such that at least the edge portions of the baffles at each entrance way overlap in a direction perpendicular to the front wall and such that a constricted passageway 23 is formed between them. The housing 20 is generally rectangular in shape, and is preferably mounted in an inclined position with the top of the extractor tilted forwardly as illustrated. The particular position of the extractor may be altered for different applications, but the angle of the face plate is preferably less than about 45° from the vertical position.

As the hot exhaust stream enters the extractor through the dual entranceways 21, the fumes pass through a pair of constrictions 23 defined by a pair of relatively long baffles 24 and a pair of correspondingly relatively short baffles 25. These constrictions sharply reduce the cross-sections of the two portions of the exhaust stream, with a corresponding increase in the fluid velocity. This velocity is generally at least about ten times greater than the velocity at the face of a conventional mesh filter, with a corresponding increase in the pick-up ability of the extractor. From the constrictions 23, the velocious exhaust streams pass into a pair of expansion chambers 26 defined by the side walls 27 and the rear wall 28 of the extractor housing. The increased volume of the expansion chambers 26 cause the exhaust streams to expand rapidly with resultant decreases in the fluid velocity and temperature, thereby causing the grease and oil vapors in the exhaust stream to condense and agglomerate. Although the invention will be described hereinafter with reference to only one exhaust stream, it will be understood that all the flow patterns are duplicated at opposite ends of the extractor.

According to one aspect of the present invention, the condensed and agglomerated grease and oil is removed from the continuously moving exhaust stream by providing an expansion chamber which is adapted to reverse the direction of flow of the rearwardly moving exhaust stream so that it flows toward the front of the housing. The centrifugal action resulting from this reversal of flow, which occurs concurrently with the cooling expansion described above, causes the agglomerated grease and oil to be deposited on the walls of the housing. Thus in the illustrative extractor, each expansion chamber 26 is defined by one of the side walls 27, a portion of the rear wall 28, and an inturned rear baffle 30. As the exhaust stream issues from the constriction at the end of the baffle 24, it is directed in an arcuate path by the successive action of the side wall 27, the rear wall 28, and the baffle 30 until it has turned substantially 180° and is flowing forwardly along the rear side of the baffle 24.

The sudden expansion of the velocious exhaust stream and the concurrent centrifugal action from the 180° turn in the fluid flow produces a heavy "plating out" of the agglomerated grease and oil on the inside walls of the expansion chamber. Since the extractor 17 is located directly over the cooking surface 11, the walls of the extractor are at a sufficiently high temperature to cause the deposited grease and oil to remain in substantially fluid condition and run down to the bottom of the housing. Because of the tilted position of the extractor, gravity causes the extracted liquid to run to the lower front edge of the housing, where it seeps through slots 31, between the bottom and front wall of the housing, into a bottom holding tray 32. The holding tray 32, in turn, is provided with a plurality of drain holes 33 which allow the liquid to drip down onto an inclined trough 34 which empties into a grease drawer 35 at the end of the cabinet 14. As the drawer 35 becomes filled with accumulated grease and oil, it can be periodically removed and cleaned.

In accordance with one feature of the invention, the baffles which define the constriction adjacent the extractor entranceway are adapted to deflect the incoming, grease-laden exhaust stream against the adjacent extractor side wall 27. Consequently, the constriction 23 not only increases the velocity of the exhaust stream prior to its discharge into the expansion chamber 26, but also effects a substantial ram action against the extractor side walls, thereby "plating out" a portion of the grease and oil vapors prior to the expansion. Thus, in the particular embodiment illustrated in the drawings, the baffle 24 which forms the inboard side of the initial constriction extends obliquely back toward the adjacent side wall 27 so as to direct the velocious exhaust stream against that side wall. The exact angle at which the fluid impinges against the side wall 27 should be large enough to provide a substantial ram action for depositing grease on the side wall, but not so large as to unduly reduce the velocity of the exhaust stream. In general, the angle between each side wall 27 and the corresponding projected baffle 24 is suitably on the order of 57° or 58°.

In order to insure that a maximum amount of grease and oil is removed in the expansion chamber 26, the inner end portion 30a of each baffle 30 is bent transversely to the direction of fluid flow so as to form a small lip or trap which collects a substantial portion of the grease and oil which might not have been plated out on the main walls 27, 28, 30 of the expansion chamber 26. Since the trap lip 30a is located at the outer periphery of the turning exhaust stream, it is in the area of the greatest concentration of remaining grease and oil particles for maximum efficiency.

In accordance with a further aspect of the invention, the residual exhaust stream from each expansion chamber 26 is passed through a second constriction to increase its velocity again, and the resulting velocious stream is passed into a second expansion area 55 where it is allowed to expand again just prior to its discharge from the extractor. This final expansion serves to cool the exhaust stream before its entry into the flue, thereby considerably reducing the fire hazard in the flue. Thus, in the illustrative device, as the exhaust stream flows forwardly after having its flow direction reversed in the expansion chamber 26, it flows through a constriction 36 defined by the back of the baffle plate 24 and the forward edge of the baffle lip 30a. In the particular embodiment illustrated, the second constriction 36 is not as narrow as the first constriction 23 on the front side of the baffle 24, but it nevertheless effects a substantial increase in the fluid velocity by reducing the cross-section of the exhaust stream. It will be appreciated that the relative sizes of the first and second constrictions may be varied without departing from the spirit and scope of this invention.

As the velocious exhaust gases from the constriction 36 pass the baffle lip 30a, they enter a final expansion chamber defined by the front wall 22 of the housing and the opposed sides of the two baffles 30. In this chamber, the two exhaust streams from the opposite sides of the extractor are allowed to expand as they merge with each other, thereby directing the resulting merged discharged stream rearwardly between the opposed surfaces of the baffles 30 and finally out through the exit opening 37 in the rear wall 28. As a result of the cooling expansion of the exhaust gases in this final expansion area, the discharged exhaust stream is at a relatively low temperature which not only protects against fires in the flue, but also helps to increase the longevity of the flue and other downstream portions of the ventilating system.

The cooling expansion of the exhaust stream as it issues from the second constriction 36 also effects a secondary condensing and agglomeration of any grease and oil vapors remaining in the exhaust stream. Moreover, since the merger of the two streams from the opposite sides of the extractor result in a general reversal in the direction of flow of the fluids issuing from the constrictions 36, there is also a secondary centrifugal action which tends to deposit the agglomerated grease and oil on the front wall 22 of the housing. For the purpose of insuring that a maximum amount of agglomerated grease and oil is plated out on the housing walls prior to the merger of the fluid streams, a pair of traps in the form of rearwardly projecting lips or flanges 39 are mounted on the inner surface of the front wall 22 directly opposite the two baffles 30. As in the case of the traps 30a, the traps 39 are located at the outer periphery, i.e., in the area of greatest grease density, of the turning exhaust stream.

In carrying out the present invention, all the internal elements of the grease extractor extend in the same direction as the main walls of the generally rectangular, box-like housing. Thus, the baffles 24, 25, and 30 and the traps 30a and 39 all extend in the same direction as the front and back walls 22 and 28 and the side walls 27 of the housing. Consequently, no matter where the extracted grease and oil are deposited within the housing, they are free to run downwardly over smooth, uninterrupted surfaces to the lower front corner of the extractor where they are collected in the holding tray 32. Similarly, this unidirectional construction also facilitates cleaning of the extractor, since cleaning solutions can run freely through the extractor in the same manner as the grease and oil, and over the same surfaces.

It will be appreciated that the extractor of this invention is especially adaptable to simple and economical manufacture. Thus, as can be seen in FIGURE 7, the illustrative device can be conveniently constructed of two main sections, a front section 41 and a back section 42, which can be completely fabricated from linear parts that can be brake-formed, from stainless steel for example, and fastened by spot welding. The front section 41 consists of a flat sheet 43 defining the entrance openings 21 and the baffles 25, a sheet 44 which forms the baffles 24 and is spot welded to the plate 43, and a pair of angle members which form the traps 39 and are spot welded to the plate 44. The back section 42 consists simply of a pair of preformed sheets 45 which are spot welded to the top and bottom sheets 46 and 47, respectively. For the purpose of connecting the two sections 41 and 42 to complete the extractor, a stud bolt 49 (FIG. 7) is mounted on the bottom sheet 47. The bolt 49 projects through an aperture in the front section to receive a knob 50 which is threaded onto the bolt to hold the two sections firmly together.

In order to modify the present extractor to accommodate different air capacities of the various ventilating systems in which it can be employed, it is preferred to vary the height of the entranceways 21 and the associated inlet baffles 24, 25. In this way, the capacity of the extractor can be conveniently varied for different ventilating systems without any changes whatever in the cross-sectional design, such as that illustrated in FIGURE 3. In other words, the capacity of the extractor can be altered by simply lengthening all of the elements of the extractor in the vertical direction. In cases where the required capacity is too large for a single extractor, a plurality of the extractors of this invention can be readily connected in series so as to form a bank of extractors of any desired length. Thus, in FIGURE 4 three extractors 51, 52 and 53 are connected in series simply by the use of a common holding tray 54 extending along the bottoms of the units and an elongated connector bar 55 extending along the tops of the units. If desired, this multiple unit may be constructed with a single solid face plate with any desired number of pairs of entrance openings and a corresponding number of individual back sections. It will be appreciated that by varying the height of the individual units and/or using multiple units of the type illustrated, there is a virtually unlimited range of capacities that can be achieved with the present invention.

Although the present invention has been described with particular reference to one specific embodiment, it is contemplated that various modifications of the same will be readily apparent to those skilled in the art. For example, although the particular device illustrated includes only two transverse traps 30a and 39, the number and location of these traps may be varied for different applications. Also, the principles of this invention are applicable to many different geometric configurations other than the particular rectangular, box-like structure shown in the drawings.

It can be seen that this invention provides an improved grease extractor which removes the grease and oil from a hot vaporous exhaust stream simply by controlling the fluid flow, i.e., without the use of any filtering media or moving parts. Moreover, this extractor has been found to be considerably more effective and has a higher cleaning efficiency than any device of this type proposed heretofore. In this connection, the extractor of this invention not only effectively extracts the grease and oil from the exhaust stream, but also transports the extracted contaminants rapidly and efficiently out of the path of fluid flow so that the extracted material cannot become entrained in a subsequent portion of the exhaust stream. Furthermore, the present extractor is extremely simple and economical to fabricate and maintain and, indeed, can be completely fabricated from linear metal sheets which can be brake or die formed and fastened by spot welding, without the use of any curved parts whatever. Another advantage of the inventive extractor is that it substantially reduces the fire hazard in the flue and other downstream portions of the ventilating system, and also improves the longevity of the downstream portions of the ventilating system by maintaining a relatively low operating temperature therein. In addition, since all the elements of the extractor of this invention extend in the same direction, the extractor is extremely simple to clean, and the compact construction greatly facilitates both installation and removal of the device.

I claim as my invention:
1. A grease extractor for use over a cooking range for removing grease, oil and other contaminants from a vaporous exhaust stream, said grease extractor comprising the combination of a housing including an upwardly extending substantially planar front wall having a pair of spaced apart vertically elongated entrance openings formed therein for receiving the grease-laden exhaust stream; said entrance openings each having an inboard and an outboard edge; a rear wall spaced apart from said front wall and having a central exit opening therein for discharging the exhaust stream after the extraction of grease; a pair of spaced apart side walls and spaced apart top and bottom walls interconnecting the front and rear walls; said front, rear, top, bottom and side walls defining a box-like chamber; the outboard edges of said entrance openings formed in said front wall being spaced a substantial distance away from said side walls; a pair of front planar baffle plates extending from the inboard edges of said entrance openings obliquely back toward said side walls so that the rear edge of each baffle plate extends substantially as far toward the side wall as the outboard edge of the corresponding entrance opening; said baffle plates deflecting the entering exhaust gases against said side walls, said baffle plates and said walls defining therebetween constrictions between said baffle plates and a respective side wall which increase the velocity of the exhaust gases and effect a substantial ram action against the side walls and thereby deposit a portion of the grease from the exhaust gases on the side walls; a pair of expansion chambers disposed rearwardly of said constrictions and defined by the adjacent portions of said side walls, said front baffle plates and said rear wall of the extractor housing and also by a pair of rear baffle plates attached to said rear wall at the edges of said exit opening and extending forwardly toward said front wall; said expansion chambers receiving the velocious exhaust gases from said constrictions and expanding the exhaust gases; said expansion chambers also reversing the direction of flow of the rearwardly moving exhaust gases so that they flow toward the front of the housing and agglomerated grease and oil are deposited on the walls of said chambers by centrifugal action due to the flow reversals; said rear baffle plates extending forwardly through at least a major portion of the distance between said rear wall and said rear edges of said front baffle plates so that the forward edges of said rear baffle plates cooperate with the back sides of the front baffle plates to define second constrictions which increase the velocity of the exhaust gases and effect a substantial ram action against the back face of the front wall intermediate the inboard edges of said entrance openings and thereby deposit a portion of the grease from the exhaust gases on the back face of said front wall; a secondary expansion chamber defined by the back face of the front wall intermediate the inboard edges of said entrance openings of the housing and said rear baffle plates and receiving the velocious exhaust gases from the second constrictions and directing said gases rearwardly toward the exit opening; said front, rear and side walls of said housing and said front and rear baffles extending down to and in vapor flow preventing contact with said bottom wall so that the extracted grease and oil run downwardly thereover to said bottom wall; said bottom wall being substantially planar and inclined forwardly and downwardly when the grease extractor is in its installed position; drain opening means formed in said bottom wall and adjacent the back face of said front wall and operatively associated with the lower edge of each of said entrance openings, said drain opening means extending from the inboard to the outboard edge of each entrance opening; and a grease trough disposed below said bottom wall and operatively associated with said drain opening means and collecting the grease and oil draining through said drain opening means and preventing grease and oil from dripping over the lower edge of the entrance openings back onto said cooking range.

2. A grease extractor for use over a cooking range for removing grease, oil and other contaminants from a vaporous exhaust stream, said grease extractor comprising the combination of a housing including a front wall having a pair of narrow vertically elongated spaced apart entrance openings formed therein; said entrance openings each having an inboard and an outboard edge and receiving the grease-laden exhaust stream from said cooking range; a rear wall having a central exit opening formed therein and discharging the exhaust stream after the extraction of grease therefrom; a pair of side walls and top and bottom walls interconnecting the front and rear walls; the outboard edge of each of said entrance openings formed in said front wall being spaced a substantial distance away from said side walls, a pair of planar front baffle plates within said housing and attached to said front wall at the respective inboard edge of an associated one of said entrance openings and cooperating with said walls to form a constriction adjacent each entrance opening and between said front baffle and said side wall; said front baffle plates extending from the inboard edge of each entrance opening back toward said side walls so that the rear edge of each front baffle plate extends substantially as far toward the side wall as the outboard edge of the corresponding entrance opening and deflects all the entering vapors toward a respective side wall and produces a substantial ram action of the vapor against the respective side wall and thereby deposits a portion of the grease and oil from said stream or said side wall; a pair of rear baffle plates attached to said rear wall and extending forwardly toward said front wall from the opposite side edges of said exit opening; portions of said rear and side walls and said front and rear baffles defining two first expansion chambers; each said constriction having a respective one of said expansion chambers operatively associated therewith and receiving the velocious exhaust stream from a respective constriction; each said expansion chamber being constructed and arranged to reverse the direction of flow of the exhaust stream issuing from said respective constriction and to deposit the agglomerated grease and oil on the walls of the respective expansion chamber by centrifugal action due to the flow reversal; said rear baffle plates extending through at least a major portion of the distance between said rear wall and the rear edges of said front baffle plates; said front, rear, and side walls of said housing and said front and rear baffle plates extending down to and in vapor flow preventing contact with said bottom wall so that the extracted grease and oil run downwardly thereover to said bottom wall; said bottom wall being inclined forwardly and downwardly in the installed position of the extractor over said cooking range; a drain opening means formed in said bottom wall adjacent the back face of the front wall and which continuously drains the extracted grease and oil out of said housing and avoids any accumulation of grease and oil inside the housing and prevents grease and oil from dripping over the lower edge of the entrance openings back onto said cooking range; said drain opening means extending the full distance from one side wall to the other; a grease trough depending from said front wall and extending rearwardly beneath said bottom wall and operatively associated with said drain opening means and collecting the grease and oil draining through said drain opening means; portions of said front and rear baffles defining a pair of second constrictions therebetween which decrease the cross-sectional area of each exhaust stream as it passes from a respective first expansion chamber to said exit opening and produces a substantial ram action of said stream against the back face of said front wall intermediate the inboard edges of said inlet openings and thereby deposits a portion of the grease and oil from said stream on the back face of said front wall; and the portion of said front wall intermediate the inboard edges of said openings and portions of said front and rear baffles defining a single second expansion chamber which reverses the exhaust stream flowing from said second constrictions and directs it out said exit opening.

3. A grease extractor as defined in claim 2 which includes a plurality of trap means extending transversely to the path of fluid flow within said housing for trapping the condensed grease and oil at the periphery of the exhaust stream.

References Cited

UNITED STATES PATENTS

| | | | |
|---|---|---|---|
| 692,390 | 2/1902 | Waggoner | 55—423 |
| 1,062,264 | 5/1913 | Wischner | 55—423 |
| 2,058,240 | 10/1936 | Hobbs | 55—443 X |
| 2,266,259 | 12/1941 | Perham | 55—484 X |
| 2,523,529 | 9/1950 | Zwickl | 55—442 X |
| 2,535,863 | 12/1950 | Pledger | 98—115 |
| 2,564,075 | 8/1951 | Wray. | |
| 2,584,613 | 2/1952 | Pledger. | |
| 2,888,871 | 6/1959 | Fischer et al. | 98—115 |
| 3,021,777 | 2/1962 | Smith | 98—115 |
| 3,125,941 | 3/1964 | Grout et al. | 55—440 |
| 3,176,605 | 4/1965 | Jenson | 98—115 |
| 3,217,470 | 11/1965 | Omohundro | 55—279 |
| 3,221,635 | 12/1965 | Hill. | |

HARRY B. THORNTON, *Primary Examiner.*

ROBERT F. BURNETT, *Examiner.*

D. TALBERT, *Assistant Examiner.*